United States Patent [19]

Tachikawa et al.

[11] Patent Number: 5,069,992

[45] Date of Patent: Dec. 3, 1991

[54] ELECTROPHOTOGRAPHIC PRINTING PLATE PRECURSOR CONTAINING ALKALI-SOLUBLE POLYURETHANE RESIN AS BINDER RESIN

[75] Inventors: Hiromichi Tachikawa; Hiroaki Yokoya; Syu Watarai, all of Kanagawa; Toshiaki Aoai, Sizuoka, all of Japan

[73] Assignee: Fuji Photo Film Co., Ltd., Kanagawa, Japan

[21] Appl. No.: 614,421

[22] Filed: Nov. 16, 1990

[30] Foreign Application Priority Data

| Nov. 17, 1989 | [JP] | Japan | 1-299157 |
| Apr. 27, 1990 | [JP] | Japan | 2-110577 |
| Apr. 27, 1990 | [JP] | Japan | 2-110578 |

[51] Int. Cl.$^5$ ............................................. G03G 13/28
[52] U.S. Cl. ....................................... 430/49; 430/96
[58] Field of Search ........................................ 430/49, 96

[56] References Cited

U.S. PATENT DOCUMENTS

| 3,403,019 | 9/1968 | Stahly et al. | 430/96 |
| 4,668,600 | 5/1987 | Lingnau | 430/96 |
| 4,684,594 | 8/1987 | Schmitt et al. | 430/49 |
| 4,788,118 | 11/1988 | Takaoka et al. | 430/96 |
| 4,792,511 | 12/1988 | Kato et al. | 430/96 |
| 4,814,246 | 3/1989 | Lehmann et al. | 430/49 |
| 4,983,482 | 1/1991 | Ong et al. | 430/96 |

Primary Examiner—Marion E. McCamish
Assistant Examiner—Christopher D. Rodee
Attorney, Agent, or Firm—Sughrue, Mion, Zinn, Macpeak & Seas

[57] ABSTRACT

An electrophotographic printing plate precursor comprising an electrically-conductive support having thereon a photoconductive layer containing at least a photoconductive compound and a binding resin wherein said binding resin is an alkali-soluble polyurethane resin.

10 Claims, No Drawings

ELECTROPHOTOGRAPHIC PRINTING PLATE PRECURSOR CONTAINING ALKALI-SOLUBLE POLYURETHANE RESIN AS BINDER RESIN

FIELD OF THE INVENTION

The present invention relates to an electrophotographic printing plate precursor comprising a photoconducting layer containing an organic photoconducting compound which is designed to form an eleotrophotoqraphic process whereby a toner image is formed and the resulting non-image portion other than the toner image portion is then removed to form a printing plate.

BACKGROUND OF THE INVENTION

PS plates comprising a positive type sensitizing agent containing a diazo compound and a phenolic resin as main components or a negative type sensitizing agent containing an acrylic monomer or prepolymer as a main component have already been put into practical use as lithographic offset printing plate precursors. However, since all these printing plate precursors have a low sensitivity, these printing plate precursors are exposed to light with a film original, on which an image has been previously recorded, brought into close contact therewith to form printing plates. On the other hand, computer image processing techniques and large capacity data storage and communication techniques have recently enabled continuous computer operation including original input, correction, editing, layout and pagination. With this computer operation, an electronic editing system capable of instantly outputting data to terminal plotters via a high speed communications network or satellite communications network has also been put into practical use. In particular, this type of electronic editing system is in great demand in the field of newspaper printing requiring instant use. Furthermore, in the field of printing where a printing plate is reproduced as necessary based on an original stored in the form of film original, there is a tendency for originals to be stored as digital data in very large capacity recording media such as optical discs.

However, little or no direct type printing plate precursors designed to directly receive data from the output of terminal plotters to form a printing plate have been put into practical use. Even in stations where an electronic editing system is operated, data is outputted to a silver salt system photographic film. PS plates are then exposed to light with the silver salt system photographic film brought into contact therewith to form printing plates. One of the reasons for the above described conditions is that it is difficult to provide a direct type printing plate precursor having sufficient sensitivity to form a printing plate within a practical period of time using a light source in the output plotter (e.g., a He-Ne laser, a semiconductor laser).

An electrophotographic light-sensitive material can be a light-sensitive material with sufficient light sensitivity to provide a direct type printing plate.

Printing plate materials (printing plate precursors) utilizing electrophotography which are known include zinc oxide-resin dispersion system offset printing plate materials as described in JP-B-47-47610, 48-40002, 48-18325, 51-15766, and 51-25761 (the term "JP-B" as used herein means an "examined Japanese patent publication"). Such a printing plate material is designed to be subjected to an electrophotographic process which comprises the formation of toner images and then a treatment which comprises impregnation with a desensitizing solution (e.g., an acidic aqueous solution containing a ferrocyanide or ferricyanide) to desensitize the non-image portion. Offset printing plates thus treated have a printing capability of 5,000 to 10,000 sheets and thus are not suitable for printing more than 10,000 sheets. This system also is disadvantageous in that the desensitizing solution used includes a toxic cyanide compound.

Other known methods for the preparation of printing plates using electrophotography include methods which comprise the removal of a photoconductive layer from the non-image portion after the formation of the toner image. Examples of this type of electrophotographic printing plate precursors include those described in JP-B-37-17162, 38-6961, 38-7758, 41-2426 and 46-39405, and JP-A-50-19509, 50-19510, 52-2437, 54-145538, 54-134632, 55-105254, 55-153948, 55-161250, 56-107246, 57-147656 and 57-161863 (the term "JP-A" as used herein means an "unexamined published Japanese patent application").

In these methods, it is necessary to etch away the non-image portion from the electrophotographic photoreceptor to expose the hydrophilic surface. Therefore, is often a binding resin which is dissolved in or swells in an alkaline solvent is often used.

Examples of known binding resins which have been incorporated in electrophotographic printing plate precursors include styrene-maleic anhydride copolymers, vinyl acetate-maleic acid copolymers, vinyl acetate-maleic anhydride copolymers, and phenolic resins as described in JP-B-41-2426, 37-17162, and 38-6961, and JP-A-52-2437, 54-19803, 54-134632, 55-105254, 50-19509, and 50-19510. However, the use of such an electrophotographic printing plate precursor comprising an organic photoconducting compound has various problems. In particular, when a phenolic resin is used as the binding resin, the resulting electrophotographic printing plate precursor has a brittle film which is poor in printing resistance. Vinyl acetate-crotonic acid copolymers and vinyl acetate-maleic anhydride copolymers, are also insufficient in printing resistance. An electrophotographic printing plate precursor comprising an acrylic ester binder exhibits an excellent printing resistance, but unfortunately exhibits insufficient solubility in an alkaline aqueous solution which requires a long etching time. In the preparation of an electrophotographic printing plate using this system, since the light-sensitive layer the non-image area is etched with the developed toner image as resist layer, lateral etching called side etching easily takes place, causing a deterioration in picture quality.

SUMMARY OF THE INVENTION

Therefore, an object of the present invention is to provide an electrophotographic printing plate precursor which exhibits an excellent printing resistance.

Another object of the present invention is to provide an electrophotographic printing plate precursor which exhibits excellent image quality.

A further object of the present invention is to provide a high sensitivity electrophotographic printing plate precursor suitable for image formation using a scanning exposure to light, e.g., using a laser.

These and other objects of the present invention will become apparent from the following detailed description of and examples of the present invention.

These objects of the present invention are accomplished with an electrophotographic printing plate precursor comprising an electrically-conductive support having thereon a photoconductive layer containing at least one photoconductive compound and a binding resin for an electrophotographic process wherein a toner image is formed and the photoconductive layer in the non-image areas other than the toner image areas is then removed to form a printing plate, wherein the binding resin comprises an alkali-soluble polyurethane resin.

DETAILED DESCRIPTION OF THE INVENTION

Preferred examples of alkali-soluble polyurethane resins which can be used in the present invention include polyurethane resin comprising a basic skeleton of units of a diisocyanate compound containing a diisocyanate group of the general formula (I) and units of a diol compound containing carboxyl groups of the general formulae (II), (III) and (IV).

$$OCN-R_1-NCO \quad (I)$$

$$OCN-R_1-NCO \quad (I)$$

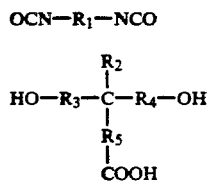
(II)

(III)

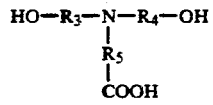
(IV)

In the above general formulae, $R_1$ represents a divalent aliphatic or aromatic hydrocarbon having 2 or more, preferably 2 to 20 carbon atoms which may contain substituents (preferred examples of such substituents include alkyl, aralkyl, aryl, alkoxy, and halogen atoms). $R_1$ may optionally contain other functional groups which do not react with an isocyanate group, such as ester, urethane, amide and ureido groups.

$R_2$ represents a hydrogen atom or a $C_{1-8}$ alkyl, $C_{6-15}$ aralkyl, $C_{6-15}$ aryl, $C_{1-8}$ alkoxy or $C_{6-15}$ aryloxy group which may contain substituents (examples of such substituents include cyano, nitro, halogen (e.g., F, Cl, Br, I), $-CONH_2$, $-COOR_6$, $-OR_6$, $-NHCONHR_6$, $-NHCOOR_6$, $-NHCOR_6$, $-OCONHR_6$, and $-CONHR_6$ in which $R_6$ represents a $C_{1-10}$ alkyl group or $C_{7-15}$ aralkyl group). Preferred of these groups are a hydrogen atom, a $C_{1-8}$ alkyl group, and a $C_{6-15}$ aryl group. $R_3$, $R_4$ and $R_5$ may be the same or different and each represents a divalent aliphatic or aromatic hydrocarbon group which may contain single bonds and substituents (e.g., alkyl, aralkyl, aryl, alkoxy, halogen). Preferred of these groups are a $C_{1-20}$ alkylene group and a $C_{6-15}$ arylene group, more preferably a $C_{1-8}$ alkylene group. If necessary, any of $R_3$, $R_4$ and $R_5$ may be other functional groups which do not react with an isocyanate group, such as carbonyl ester, urethane, amide, ureido, and ether group. Furthermore, two or three of $R_2$, $R_3$, $R_4$ and $R_5$ may combine and form a ring.

Ar represents a trivalent aromatic hydrocarbon which may contain substituents, and preferably a $C_{6-15}$ aromatic group.

Specific examples of carboxyl group-containing diol compounds represented by the general formula (II), (III) or (IV) include 3,5-dihydroxybenzoic acid, 2,2-bis(hydroxy-methyl)propionic acid, 2,2-bis(2-hydroxyethyl)-propionic acid, 2,2-bis(3-hydroxypropyl)propionic acid, bis(hydroxy-methyl)acetic acid, bis(4-hydroxyphenyl)acetic acid, 4,4-bis-(4-hydroxyphenyl)-pentanoic acid, tartaric acid, N,N-dihydroxyethylglycine, and N,N-bis(2-hydroxyethyl)-3-carboxy-propionamide.

The alkali-soluble polyurethane resin to be used in the present invention contains in its skeleton a structural unit in an amount of at least 1 mol % derived from a compound obtained by ring-opening of a tetracarboxylic dianhydride with a diol compound.

Preferred examples of such a tetracarboxylic dianhydride include those represented by the general formulae (V), (VI) and (VII):

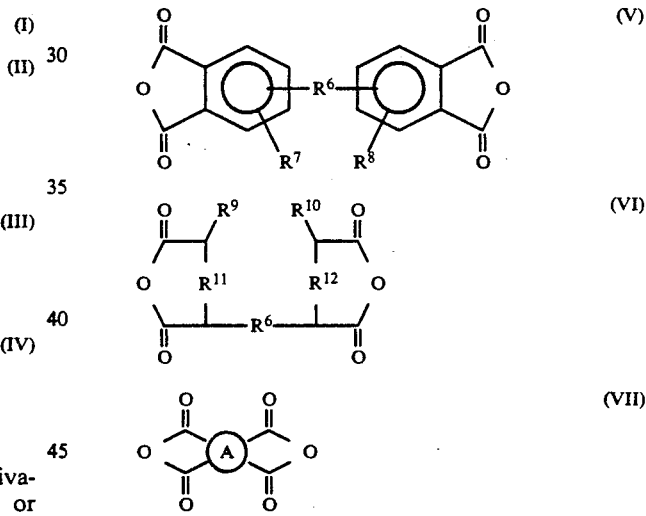

In the above general formulae, $R^6$ represents a divalent aliphatic or aromatic hydrocarbon having 2 or more, preferably 2 to 30 carbon atoms group which may or may not contain substituents (preferred examples of such substituents include $C_{1-8}$ alkyl, $C_{6-15}$ aralkyl, $C_{6-15}$ aryl, $C_{1-8}$ alkoxy, halogen, ester, and amide), $-CO-$, $-SO-$, $-SO_2-$, $-O-$ or $-S-$. Preferred of these groups are a $C_{1-15}$ divalent aliphatic hydrocarbon groups which may or may not contain substituents (preferred examples of such substituents include alkyl, aralkyl, aryl, alkoxy, halogen, ester, and amide), $-CO-$, $-SO_2-$, $-O-$, and $-S-$. $R^7$ and $R^8$ may be the same or different and each represents a hydrogen atom, an alkyl group, an aralkyl group, an aryl group, an alkoxy group or a halogen atom. Preferred of these are a hydrogen atom, a $C_{1-8}$ alkyl group, a $C_{6-15}$ aryl group, a $C_{1-8}$ alkoxy group, and a halogen atom. Two of $R^6$, $R^7$ and $R^8$ may combine and form a ring. $R^9$ and $R^{10}$ may be the same or different and each represents a hydrogen atom, an alkyl group, an aralkyl group, an aryl group or a halogen atom. Preferred of these are a hydrogen atom, a $C_{1-8}$ alkyl group, and a $C_{6-15}$ aryl group. Two of $R^6$, $R^9$ and $R^{10}$ may combine connected to each other to form a ring. $R^{11}$ and $R^{12}$ may be the same or different and each represents an unsubstituted saturated single bond or double bond or a divalent aliphatic hydrocarbon group. Preferred among these are a double bond and a methylene group as a divalent aliphatic hydrocarbon group. A represents a mononuclear or polynuclear aromatic ring, preferably a $C_{6-18}$ aromatic ring.

Specific examples of compounds represented by the general formula (V), (VI) or (VII) include pyromellitic dianhydride, 3,3',4,4,-benzophenonetetracarboxylic dianhydride, 3,3',4,4,-diphenyltetracarboxylic dianhydride, 2,3,6,7-naphthalenetetracarboxylic dianhydride, 1,4,5,8-naphthalenetetracarboxylic dianhydride, 4,4,-sulfonyldiphthalic dianhydride, 2,2-bis(3,4-dicarboxyphenyl)propane dianhydride, bis(3,4-dicarboxyphenyl)ether dianhydride, 4,4'-[3,3'-(alkylphospholyldiphenylene)-bis(iminocarbonyl)]diphthalic dianhydride, aromatic tetracarboxylic dianhydrides such as the addition product of hydroquinonediacetate and trimellitic anhydride and the addition product of diacetyldiamine and trimellitic anhydride, alicyclic tetracarboxylic dianhydrides such as 5-(2,5-dioxotetrahydrofuryl)-3-methyl-3-cyclohexene-1,2-dicarboxylic anhydride (Epiclon B-4400, available from Dainippon Ink And Chemicals, Incorporated), 1,2,3,4-cyclopentanetetracarboxylic dianhydride, 1,2,4,5-cyclohexanetetracarboxylic dianhydride, and tetrahydrofuranetetracarboxylic dianhydride, and aliphatic tetracarboxylic dianhydrides such as 1,2,3,4-butane-tetracarboxylic dianhydride and 1,2,4,5-pentanetetracarboxylic dianhydride.

Examples of methods for incorporating a structural unit derived from a compound obtained by ring-opening of these tetracarboxylic dianhydrides with a diol compound into the polyurethane resin include the following two methods:

(a) A method which comprises reaction with a diisocyanate compound of an alcohol-terminated compound obtained by ring-opening of a tetracarboxylic dianhydride with a diol compound; and (b) A method which comprises reaction with a tetracarboxylic dianhydride of an alcohol-terminated urethane compound obtained by reaction of a diisocyanate compound in the presence of an excess of a diol compound.

When a polyurethane resin is synthesized by the methods (a) or (b), two or more diisocyanate compounds, diol compounds and tetracarboxylic dianhydrides can be used.

In the reactions (a) and (b), the above mentioned diol compounds can be further used as long as they do not deteriorate the alkali-developability of the printing plate.

If desired, a carboxyl group-containing diol compound of the general formula (II), (III) or (IV) can be used.

Other polyurethane resins which can be used in the present invention can contain at least one of the diol compounds represented by the general formulae (VIII) to (XII) as structural units to accomplish the above mentioned objects.

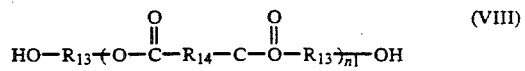

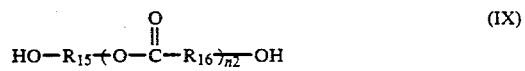

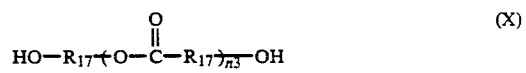

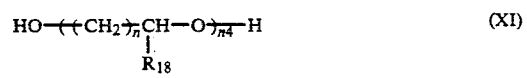

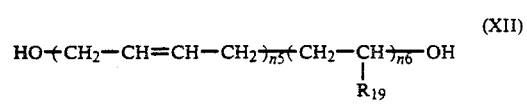

In the above formulae, $R_{13}$, $R_{14}$, $R_{15}$, $R_{16}$ and $R_{17}$ may be the same or different and each represents a divalent aliphatic or aromatic hydrocarbon group. Preferably, $R_{13}$, $R_{15}$, $R_{16}$ and $R_{17}$ represents a $C_{2-20}$ alkylene group or a $C_{6-15}$ arylene group, more preferably a $C_{2-10}$ alkylene group or a $C_{6-10}$ arylene group, and $R_{14}$ represents a $C_{1-20}$ alkylene group or a $C_{6-15}$ arylene group, more preferably a $C_{1-10}$ alkylene group or a $C_{6-10}$ arylene group. Any of $R_{13}$, $R_{14}$, $R_{15}$, $R_{16}$ and $R_{17}$ may be other functional groups which do not react with an isocyanate group, such as ether, carbonyl, ester, cyano, olefin, urethane, amide and ureide group and halogen atoms. $R^{18}$ represents a hydrogen atom, an alkyl group, an aryl group, an aralkyl group, a cyano group or a halogen atom, preferably a hydrogen atom, a $C_{1-10}$ alkyl group, a $C_{6-15}$ aryl group, a $C_{7-15}$ aralkyl group, a cyano group or a halogen atom, more preferably a hydrogen atom, a $C_{1-6}$ alkyl group or a $C_{6-10}$ aryl group. The groups represented by $R_{18}$, may be other functional groups which do not react with an isocyanate group, such as alkoxy, carbonyl, olefin, ester and halogen. $R_{19}$ represents an aryl group or a cyano group, preferably a $C_{6-10}$ aryl group or a cyano group. The suffix n represents an integer 2 to 4. The suffixes n1, n2, n3, n4 and n5 each represents an integer 2 or more, preferably 2 to 100. The suffix n6 represents 0 or an integer 2 or more, preferably 0 or an integer 2 to 100.

Specific examples of diol compounds represented by the general formulae (VIII) to (XII) are set forth below.

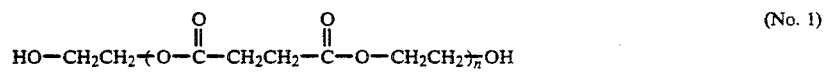

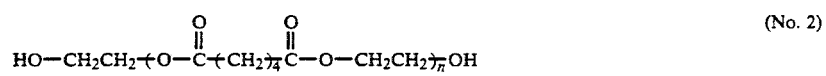

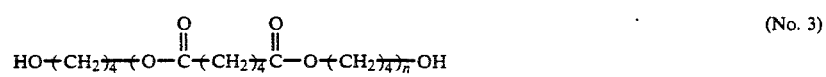

$$HO-CH_2-\underset{\underset{CH_3}{|}}{\overset{\overset{CH_3}{|}}{C}}-CH_2\!\!-\!\!\left(\!O-\overset{O}{\overset{\|}{C}}\!-\!(CH_2)_4\!-\!\overset{O}{\overset{\|}{C}}\!-\!O-CH_2-\underset{\underset{CH_3}{|}}{\overset{\overset{CH_3}{|}}{C}}-CH_2\!\right)_{\!\!n}\!\!OH \quad \text{(No. 4)}$$

$$HO-CH_2CH_2-O-CH_2CH_2\!\!-\!\!\left(\!O-\overset{O}{\overset{\|}{C}}\!-\!(CH_2)_4\overset{O}{\overset{\|}{C}}\!-\!O-CH_2CH_2-O-CH_2CH_2\!\right)_{\!\!n}\!\!OH \quad \text{(No. 5)}$$

$$HO-(CH_2)_4\!\!-\!\!\left(\!O-\overset{O}{\overset{\|}{C}}\!-\!(CH_2)_4\overset{O}{\overset{\|}{C}}\!-\!O-(CH_2)_4\!\right)_{\!\!n}\!\!OH \quad \text{(No. 6)}$$

$$HO-CH_2\!\!-\!\!\underset{}{\text{C}_6H_4}\!\!-\!\!CH_2\!\!-\!\!\left(\!O-\overset{O}{\overset{\|}{C}}\!-\!(CH_2)_4\overset{O}{\overset{\|}{C}}\!-\!O-CH_2\!\!-\!\!\underset{}{\text{C}_6H_4}\!\!-\!\!CH_2\!\right)_{\!\!n}\!\!OH \quad \text{(No. 7)}$$

$$HO\!\!-\!\!\underset{}{\text{C}_6H_4}\!\!-\!\!\left(\!O-\overset{O}{\overset{\|}{C}}\!-\!(CH_2)_6\overset{O}{\overset{\|}{C}}\!-\!O\!-\!\underset{}{\text{C}_6H_4}\!\right)_{\!\!n}\!\!OH \quad \text{(No. 8)}$$

$$HO-(CH_2)_4\!\!-\!\!\left(\!O-\overset{O}{\overset{\|}{C}}\!-\!\underset{}{\text{(m-C}_6H_4)}\!-\!\overset{O}{\overset{\|}{C}}\!-\!O-(CH_2)_4\!\right)_{\!\!n}\!\!OH \quad \text{(No. 9)}$$

$$HO-CH_2CH_2\!\!-\!\!\left(\!O-\overset{O}{\overset{\|}{C}}\!-\!(CH_2)_6\!\right)_{\!\!n}\!\!OH \quad \text{(No. 10)}$$

$$HO-CH_2CH_2\!\!-\!\!\left(\!O-\overset{O}{\overset{\|}{C}}\!-\!(CH_2)_4\!\right)_{\!\!n}\!\!OH \quad \text{(No. 11)}$$

$$HO-CH_2CH_2\!\!-\!\!\left(\!O-\overset{O}{\overset{\|}{C}}\!-\!(CH_2)_3\!\right)_{\!\!n}\!\!OH \quad \text{(No. 12)}$$

$$HO-(CH_2)_6\!\!-\!\!\left(\!O-\overset{O}{\overset{\|}{C}}\!-\!(CH_2)_5\!\right)_{\!\!n}\!\!OH \quad \text{(No. 13)}$$

$$HO-(CH_2)_6\!\!-\!\!\left(\!O-\overset{O}{\overset{\|}{C}}\!-\!(CH_2)_6\!\right)_{\!\!n}\!\!OH \quad \text{(No. 14)}$$

$$HO-(CH_2)_5\!\!-\!\!\left(\!O-\overset{O}{\overset{\|}{C}}\!-\!(CH_2)_5\!\right)_{\!\!n}\!\!OH \quad \text{(No. 15)}$$

$$HO-(CH_2)_4\!\!-\!\!\left(\!O-\overset{O}{\overset{\|}{C}}\!-\!(CH_2)_4\!\right)_{\!\!n}\!\!OH \quad \text{(No. 16)}$$

$$HO\!\!-\!\!\underset{}{\text{C}_6H_4}\!\!-\!\!\left(\!O-\overset{O}{\overset{\|}{C}}\!-\!O\!-\!\underset{}{\text{C}_6H_4}\!\right)_{\!\!n}\!\!OH \quad \text{(No. 17)}$$

$$HO\!-\!(CH_2CH_2CH_2-O)_n\!H \quad \text{(No. 18)}$$

$$HO\!-\!(CH_2CH_2\underset{\underset{CH_3}{|}}{CH}-O)_n\!H \quad \text{(No. 19)}$$

$$HO\!-\!(CH_2CH_2\underset{\underset{C_2H_5}{|}}{CH}-O)_n\!H \quad \text{(No. 20)}$$

$$HO\!-\!(CH_2CH_2\underset{\underset{C_6H_5}{|}}{CH}-O)_n\!OH \quad \text{(No. 21)}$$

$$HO\!-\!(CH_2CH_2CH_2CH_2-O)_n\!H \quad \text{(No. 22)}$$

$$HO\!-\!(CH_2-CH\!=\!CH-CH_2)_n\!OH \quad \text{(No. 23)}$$

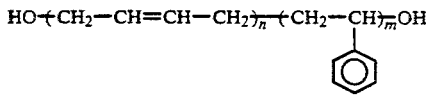

(No. 24)

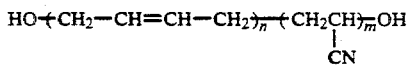

(No. 25)

In these general formulae, m and n each represent an integer 2 or more.

Specific examples of diisocyanate compounds of the general formula (I) which can be used in the present invention include aromatic diisocyanate compounds such as 2,4-tolylenediisocyanate, a dimer of 2,4-tolylenediisocyanate, 2,6-tolylenediisocyanate, p-xylylenediisocyante, m-xylylenediisocyanate, 4,4'-diphenylmethanediisocyanate, 1,5-naphthylenediisocyanate, and 3,3'-dimethylbiphenyl-4,4'-diisocyanate; aliphatic diisocyanate compounds such as hexamethylenediisocyanate, trimethylhexamethylenediisocyanate, lysinediisocyanate, diisocyanate dimerate, isophoronediisocyanate, 4,4-methylenebis(cyclohexylisocyanate), methycyclohexane-2,4(or 2,6)diisocyanate, and 1,3-(isocyanatemethyl)-cyclohexane; and diisocyanate compounds produced by the reaction of a diol and a diisocyanate, such as the addition product of 1 mol of 1,3-butyleneglycol and 2 mol of tolylenediisocyanate.

Furthermore, a carboxyl group-free diol compound which may contain substituents which do not react with other isocyanates can be used in such an amount that the alkali-developability of the printing plate is not degraded.

Specific examples of diol compounds which can be used in the present invention include ethylene glycol, diethylene glycol, triethylene glycol, tetraethylene glycol, propylene glycol, dipropylene glycol, polyethylene glycol, dipropylene glycol, polyethylene glycol, polypropylene glycol, neopentyl glycol, 1,3-butylene glycol, 1,6-hexanediol, 2-butene-1,4-diol, 2,2,4-trimethyl-1,3-pentanediol, 1,4-butanediol, 1,5-pentanediol, 1,4-bis-β-hydroxyethoxycyclohexane, cyclohexanedimethanol, tricyclodecanedimethanol, hydrogenated bisphenol A, hydrogenated bisphenol F, ethylene oxide adduct of bisphenol A, propylene oxide adducts of bisphenol A, ethylene oxide adducts of bisphenol F, propylene oxide adducts of bisphenol F, ethylene oxide adducts of hydrogenated bisphenol A, propylene oxide adducts of hydrogenated bisphenol A, hydroquinonedihydroxyethyl-ether, p-xylylene glycol, dihydroxyethylsulfone, bis(2-hydroxyethyl)-2,4-tolylenedicarbamate, 2,4-tolylene-bis(2-hydroxyethylcarbamide), bis(2-hydroxyethyl)-m-xylylenedicarbamate, and bis(2-hydroxyethyl)isophthalate.

In the alkali-soluble polyurethane resin of the present invention, an aromatic hydrocarbon group can be incorporated into either the diisocyanate compound or the diol compound to further improve printing resistance during printing. The amount of aromatic hydrocarbon in the polyurethane resin is preferably in the range of 10 % by weight or more, more preferably 20 % by weight or more.

The synthesis of the polyurethane resin used in the present invention can be accomplished by a method which comprises heating the above described diisocyanate compound and diol compound in a nonprotic solvent in the presence of known active catalysts depending on their reactivities. The molar proportion of the diisocyanate compound to the diol compound is preferably in the range of 0.8 : 1 to 1.2 : 1. If isocyanate groups remain at the terminals of the polymer, a polyurethane resin without any isocyanate groups remaining at the terminals of the polymer can be ultimately produced by treating the reaction system with an alcohol or amine.

The molecular weight of the polyurethane resin used in the present invention is preferably in the range of 1,000 or more, more preferably 5,000 to 100,000, on weight average basis.

These high molecular weight compounds can be used alone or as an admixture of two or more thereof.

Other resins can be mixed into the light-sensitive composition of the present invention in an amount of 50 % by weight or less based on the weight of the above described polymer. Examples of resins which can used include polyamide resins, epoxy resins, polyacetal resins, acrylic resins, methacrylic resins, polystyrene resins, and novolak resins.

Suitable photoconductive materials which can be used in the present invention are any of the following known compounds:

1) Triazole derivatives as described in U.S. Pat. No. 3,112,197;

2) Oxadiazole derivatives as described in U.S. Pat. No. 3,189,447;

3) Imidazole derivatives as described in JP-B-37-16096;

4) Polyarylalkane derivatives as described in U.S. Pat. Nos. 3,615,402, 3,820,989, and 3,542,544, JP-B-45-555, and 51-10983, and JP-A-51-93224, 55-108667, 55-156953, and 56-36656;

5) Pyrazoline derivatives and pyrazolone derivatives as described in U.S. Pat. Nos. 3,180,729, and 4,278,746, and JP-A-55-88064, 55-88065, 49-105537, 55- 51086, 56-80051, 56-88141, 57-45545, 54-112637, and 55- 74546;

6) Phenylenediamine derivatives as described in U.S. Pat. No. 3,615,404, JP-B-51-10105, 46-3712, 47-28336, and JP-A-54-83435, 54-110836, and 54-119925;

7) Arylamine derivatives as described in U.S. Pat. Nos. 3,567,450, 3,180,703, 3,240,597, 3,658,520, 4,232,103, 4,175,961, and 4,012,376, West German Pat. No. (DAS) 110,518, JP-B-49-35702, and 39-27577, and JP-A-55-144250, 6-119132, and 56-22437;

8) Amino-substituted chalcone derivatives as described in U.S. Pat. No. 3,526,501;

9) N,N-bicarbazyl derivatives as described in U.S. Pat. No. 3,542,546;

10) Oxazole derivatives as described in U.S. Pat. No. 3,257,203;

11) Styrylanthracene derivatives as described in JP-A-56-46234;

12) Fluorenone derivatives as described in JP-A-54-110837;

13) Hydrazone derivatives as described in U.S. Pat. No. 3,717,462, and JP-A-54-59143 (corresponding to U.S. Pat. No. 4,150,987), 55-52063, 55-52064, 55-46760, 55-85495, 57-11350, 57-148749, and 57-104144;

14) Benzidine derivatives as described in U.S. Pat. Nos. 4,047,948, 4,047,949, 4,265,990, 4,273,846, 4,299,897, and 4,306,008; and 15) Stilbene derivatives as described in JP-A-58-190963, 59-95540, 59-97148, 59-195658, and 62-36674.

In addition to the above described low molecular photoconductive compounds, the following high molecular compounds can be used:

16) Polyvinylcarbazole and derivatives thereof as described in JP-B-34-10966;

17) Vinyl polymers such as polyvinylpyrene, polyvinylanthracene, poly-2-vinyl-4-(4'-dimethylaminophenol)-5-phenyloxazole, poly-3-vinyl-N-ethylcarbazole as described in JP-B-43-18,674, 43-19,192;

18) Polymer such as polyacenaphthylene, polyindene, and copolymer of acenaphthylene and styrene as described in JP-B-43-19193;

19) Condensed resins such as pyrene-formaldehyde resin, bromopyrene-formaldehyde resin, and ethylcarbazole-formaldehyde resin as described in JP-B-56-13940; and 20) Various triphenylmethane polymers as described in JP-A-56-90883, and 56-161550.

The polyurethane resin can comprise various pigments, sensitizing dyes or the like for the purpose of improving the wavelength range sensitivity of the photoconductive unit, providing the desired sensitivity, or like purposes. Examples of these pigments include:

21) Monoazo, bisazo and triasazo pigments as described in U.S. Pat. Nos. 4,436,800, and 4,439,506, JP-A-47-37543, 58-123541, 58-192042, 58-219263, 59-78356, 60-179746, 61-148453, and 61-238063, and JP-B-60-5941, and 60-45664;

22) Phthalocyanine pigments such as metallic phthalocyanine pigments and metal-free phthalocyanines as described in U.S. Pat. Nos. 3,397,086, and 4,666,802;

23) Perylene pigments as described in U.S. Pat. No. 3,371,884;

24) Indigo and thioindigo derivatives as described in British Pat. No. 2,237,680;

25) Quinacridone pigments as described in British Pat. No. 2,237,679;

26) Polycyclic quinone pigments as described in British Pat. No. 2,237,678, and JP-A-59-184348, and 62-28738;

27) Bisbenzimidazole pigments as described in JP-A-47-30331;

28) Squalem salt pigments as described in U.S. Pat. Nos. 4,396,610; and 4,644,082;

29) Azlenium salt pigments as described in JP-A-59-53850, and 61-212542.

Examples of the above described sensitizing dyes include known compounds as described in *Sensitizer*, page 125, Kodansha, 81987, *Electrophotography*, 12, 9(1973), and *Organic Synthetic Chemistry*, 24, No. 11, 1010(1966). Examples of such compounds include:

30) Pyrilium dyes as described in U.S. Pat. Nos. 3,141,770, and 4,283,475, JP-B-48-25658, and JP-A-62-71965;

31) Triarylmethane dyes as described in *Applied Optics Supplement*, 3, 50(1969), and JP-A-50-39548;

32) Cyanine dyes as described in U.S. Pat. No. 3,597,196; and

33) Styryl dyes as described in JP-A-60-163047, 59-164588, and 60-252517.

These compounds can be used alone or in combination. Furthermore, if these electric charge generators are capable of not only generating electric charge but also transporting an electric charge, they can be coated in the form of a dispersion in a binder as a basic material to form a photoreceptor. In other words, the use of an organic photoconductive compound (e.g., compounds within the scope of the above described groups (1) to (20)) is not necessarily required.

For the purpose of improving sensitivity, the photoconducting layer of the present invention can comprise an electrophilic compound such as trinitrofluorenone, chloranil, and tetracyanoethylene, a compound as described in JP-A-58-65439, 58-102239, 58-129439, and 62-71965, or the like.

The preparation of the electrophotographic printing plate precursor of the present invention can be accomplished by coating a photoconducting layer onto an electroconductive substrate using conventional processes. Examples of methods for the preparation of a photoconductive layer include a method which comprises incorporating the components of the photoconductive layer in the same layer and a method which comprises incorporating an electric charge carrier-generating material and an electric charge carrier-transporting material in different layers. Either method can be used.

The coating solution of the photoconductive layer can be prepared by dissolving the various components of the photoconductive layer in an appropriate solvent. Solvent-insoluble components such as pigments can be ground to a grain diameter of 0.1 to 5 μm using a ball mill, a paint shaker, a Dyno-Mill ®, an attritor or the like, and then dispersing the pigment. The binding resin and other additives to be incorporated into the photoconductive layer can be added during or after dispersion of the pigment. The coating solution thus prepared can be coated onto the substrate using known methods such as rotary coating, blade coating, knife coating, reverse roll coating, dip coating, rod bar coating and spray coating, and then dried to obtain an electrophotographic printing plate precursor. Examples of solvents which can used for the coating solution include halogenated hydrocarbons such as dichloromethane, dichloroethane and chloroform, alcohols such as methanol and ethanol, ketones such as acetone, methyl ethyl ketone and cyclohexanone, glycol ethers such as ethylene glycol monomethyl ether and 2-methoxyethyl acetate, ethers such as tetrahydrofuran and dioxane, and esters such as ethyl acetate and butyl acetate.

The photoconductive layer used in the present invention may optionally contain a plasticizer, a surface active agent, a matting agent, and other various additives for the purpose of improving the flexibility and coated surface conditions of the photoconductive layer, in addition to the photoconducting compound and the binding resin as necessary components. These additives can be incorporated in such an amount that the static properties and etchability of the photoconducting layer are not degraded.

If the present photoconductive layer has too small a film thickness, it cannot be charged with sufficient surface potential for development. On the contrary, if the photoconductive layer has too large a film thickness, lateral etching called side etching occurs upon removal thereof, making it impossible to obtain an excellent printing plate. The film thickness of the photoconducting layer is in the range of 0.1 to 30 μm, preferably 0.5 to 10 μm.

With respect to the amount of polyurethane binding resin and photoconductive compound in the photoconductive layer used in the present invention, if the amount of photoconductive compound is too small, the sensitivity is reduced. Therefore, the amount of the photoconductive compound is preferably in the range of 0.05 parts by weight or more, more preferably 0.1 parts by weight or more, based on 1 part by weight of binding resin.

Suitable electroconductive substrates for the electrophotographic printing plate precursor of the present invention include various support materials. Specific examples of suitable support materials include a synthetic resin sheet having an electroconductive surface, particularly solvent-impermeable and electroconductive paper, and an electroconductive substrate having a hydrophilic surface such as an aluminum plate, a zinc plate, a bimetallic plate (e.g., a copper-aluminum plate, a copper-stainless steel plate, a chromium-copper plate) or a trimetallic plate (e.g., a chromium-copper-aluminum plate, a chromium-lead-iron plate, a chromium-copper-stainless steel plate). The thickness of the support is preferably in the range of 0.1 to 3 mm, particularly 0.1 to 0.5 mm. An aluminum plate is particularly preferred of these substrate materials. Suitable aluminum plates which can be used in the present invention are a plate of pure aluminum comprising aluminum as a main component or a plate of aluminum alloy containing a slight amount of different atoms. The composition of such an aluminum plate is not specifically limited. Materials which have heretofore been known and commonly used can be appropriately employed in the present invention.

Aluminum plate can be grit-blasted and anodized in any conventional manner before use. Before grit-blasting, the aluminum plate may be optionally degreased with a surface active agent or an alkaline aqueous solution. The grit-blasting also can be accomplished by mechanically roughening the surface of the material, electrochemically dissolving the surface of the material or chemically and selectively dissolving the surface of the material. Mechanical roughening can be accomplished using known methods such as ball abrading, brush abrading, blast abrading or buff abrading. Electrochemical roughening can be effected in a hydrochloric acid or nitric acid electrolyte with an alternating current or direct current being supplied. As disclosed in JP-A-54-63902, the two processes can be used in combination.

The aluminum plate thus roughened is optionally subjected to etching with an alkali or neutralization.

The aluminum plate thus treated is then anodically oxidized. The electrolyte which can be used in the anodic oxidation can be sulfuric acid, phosphoric acid, oxalric acid, chromic acid or a mixture thereof. The components in and the concentration of the electrolyte depend on the type of electrolyte. The conditions under which the anodic oxidation is achieved depend on the type of electrolyte and are not specifically limited. In general, anodic oxidation is preferably conducted with an electrolyte concentration of 1 to 80 % by weight at a temperature of 5° to 70 ° C., a current density of 5 to 60 A/dm$^2$ and a voltage of 1 to 100 V for 10 seconds to 50 minutes. The amount of the film obtained by anodic oxidation is preferably in the range of 0.1 to 10 g/m$^2$, particularly 1 to 6 g/m$^2$.

An intermediate layer can be optionally employed in the electrophotographic printing plate precursor of the present invention, present for the purpose of improving the adhesivity of the electroconductive substrate and photoconductive layer and electrical properties, etchability and printing properties of the photoconductive layer.

Examples of materials which can be incorporated in the intermediate layer include casein, polyvinyl alcohol, ethyl cellulose, phenolic resins, styrene-maleic anhydride resins, polyacrylic acid, monoethanolamine, diethanolamine, triethanolamine, tripropanolamine, triethanolamine, and the hydrochlorides, oxalates, and phosphates thereof, monoaminocarboxylic acids such as aminoacetic acid and alanine, oxyamino acids such as serine, threonine, and dihydroxyethyl glycine, sulfur-containing amino acids such as cysteine and cystine, monoaminodicarboxylic acids such as aspartic acid and glutamic acid, diaminomonocarboxylic acids such as lysine, amino acids containing aromatic rings such as p-hydroxyphenyl glycine, phenylalanine and anthranilic acid, amino acids containing heterocyclic rings such as tryptophan, and proline, aliphatic aminosulfonic acids such as sulfamic acid and cyclohexylsulfamic acid, (poly)aminopolyacetic acids such as ethylenediaminetetraacetic acid, nitrilo-triacetic acid, iminodiacetic acid, hydroxyethyliminodiacetic acid, hydroxyethylenediaminetriacetic acid, ethylene-diaminediacetic acid, cyclohexanediaminetetraacetic acid, diethylenetriaminepentaacetic acid and glycol ether diaminetetraacetic acid, and the same compounds wherein the acid groups are partially or entirely in the sodium salt, potassium salt, ammonium salt or the like salt form.

An overcoat layer capable of being removed at the same time with the etching of the photoconductive layer can be optionally provided on the photoconductive layer for the purpose of improving electrostatic properties, image properties upon toner development, adhesion of the toner or the like. The overcoat layer may be a mechanically matted layer or a resin layer containing a matt agent. Examples of suitable matt agents include silicon dioxide, zinc oxide, titanium oxide, zirconium oxide, glass grains, alumina, starch, resin grains (e.g., polymethyl methacrylate, polystyrene, phenolic resin), and the matt agents as described in U.S. Pat. Nos. 2,701,245, and 2,992,101. Two or more of these matt agents can be used in combination, if desired.

Resins which can be incorporated in the overcoat resin layer containing matt agents can be appropriately selected depending on the etching solution to be used for removal of the photoconductive layer. Specific examples of such resins include gum arabic, glue, gelatin, casein, cellulose (e.g., viscose, methyl cellulose, ethyl cellulose, hydroxyethyl cellulose, hydroxypropylmethyl cellulose, carboxymethyl cellulose), starch (e.g., soluble starch, modified starch), polyvinyl alcohol, polyethylene oxide, polyacrylic acid, polyacrylamide, polyvinyl methyl ether, epoxy resins, phenolic resins (particularly preferably novolak phenolic resins), polyamides, and polyvinyl butyral. Two or more of these resins can be used in combination, if desired.

The preparation of a printing plate from the electrophotographic printing plate precursor of the present invention can be normally accomplished using any known method. Specifically, the electrophotographic printing plate precursor is essentially uniformly charged in a dark place, and then imagewise exposed to light to form a latent image thereon. Examples of exposure processes which can be used include scanning exposure with a semiconductor laser, an He-Ne laser, or the like, reflective imagewise exposure with a xenon lamp, a tungsten lamp or a fluorescent tube as a light source, and close contact exposure through a transparent positive film. The latent image thus formed is then developed with a toner. The development can be accomplished using any known method such as cascade development, magnetic brush development, powder cloud development and liquid development. Of these development processes, liquid development, which enables the formation of a fine image, is preferably used in the preparation of a printing plate. The toner image thus developed can be fixed known fixing process such as heat fixing, pressure fixing and solvent fixing. With the toner image thus fixed as a resist, the photoconductive layer in the non-image portion is removed with an etching solution to produce the printing plate.

The etching solution to be used for removal of the photoconductive insulating layer in the toner image areas after the formation of the toner image can be any solvent which can remove the photoconductive insulating layer. The solvent employed is not specifically limited. Preferably, an alkaline solvent is used in the present invention. The term "alkaline solvent" as used herein means an aqueous solution containing an alkaline compound, an organic solvent containing an alkaline compound or a mixture thereof.

Examples of suitable alkaline compounds include organic and inorganic alkaline compounds such as sodium hydroxide, potassium hydroxide, sodium carbonate, sodium silicate, potassium silicate, sodium metasilicate, potassium metasilicate, sodium phosphate, potassium phosphate, ammonia, monoethanolamine, diethanolamine, triethanolamine and other aminoalcohols. Water or any organic solvent can be used as a solvent for the etching solution. An etching solution comprising water as a main component is preferably used considering odor and environmental pollution.

The etching solution can optionally comprise various organic solvents. Preferred examples of organic solvents include lower aliphatic alcohols or aromatic alcohols such as methanol, ethanol, propanol, butanol, benzyl alcohol and phenethyl alcohol, ethylene glycol, diethylene glycol, triethylene glycol, polyethylene glycol, Cellosolve, and aminoalcohols such as monoethanolamine, diethanolamine and triethanolamine.

Furthermore, the etching solution can include a surface active agent, an antifoaming agent, and optional additives.

The toner to be used for the formation of image portion in the present invention is not specifically limited as long as it is resistant to the above described etching solution. In general, the toner which can to be used preferably comprises a resin component resistant to the etching solution.

Examples of resin components for the toner include acrylic resins comprising methacrylic acid, acrylic acid and esters thereof, vinyl acetate resins, copolymer resins such as copolymers of vinyl acetate and ethylene or vinyl chloride, vinyl chloride resins, vinylidene chloride resins, vinyl acetal resins such as polyvinyl butyral, copolymer resins such as polystyrene, styrene-butadiene copolymers and methacrylic esters, polyethylene, polypropylene and the chlorides thereof, polyester resins (e.g., polyethylene terepthalate, polyethylene isophthalate, polycarbonate of bisphenol A), phenolic resins, xylene resins, alkyd resins, vinyl-modified alkyd resins, gelatin, cellulose ester derivative such as carboxymethyl cellulose, and wax, and polypropylene.

The present invention is further described in greater detail in the following examples, but the present invention should not be construed as being limited thereto. Unless otherwise indicated, all parts, percents, ratios and the like are by weight.

SYNTHESIS EXAMPLE 1

16.1 g and 8.5 g (0.080 mol) of 2,2-bis(hydroxymethyl)-propionic acid and 8.5 g (0.080 mol) or diethylene glycol were charged into and dissolved in 120 ml of N,N-dimethylacetamide in a 500-ml three-necked round flask equipped with a condenser and an agitator. 50.1 g (0.20 mol) of 4,4,-diphenylmethane diisocyanate was added to the system. The system was then heated to a temperature of 100 ° C. for 6 hours with stirring. The system was then diluted with 200 ml of N,N-dimethylformamide and 50 ml of acetic acid. The reaction solution was then poured into 4 l of water with stirring and a white polymer was deposited. The polymer was filtered off, washed with water, and then dried in vacuo to obtain 72 g of Polymer (A-1).

Gel permeation chromatography (GPC) was used to determine the molecular weight of the polymer. The result was 37,000 on a weight average basis (standard: polystyrene). Furthermore, titration was used to determine the carboxyl group content (acid value). The result was 1.55 meq/g.

SYNTHESIS EXAMPLES 2–8

Carboxyl group-containing polyurethane resins, as shown in Table 1 below were prepared in the same manner as described in Synthesis Example 1. The molecular weight of these polyurethane resins each were in the range of 20,000 to 58,000 on a weight average basis (standard: polystyrene).

TABLE 1

| Polyurethane Resin | Diisocyanate Compound | (mol %) | Diol Compound | (mol %) | Acid Value (meq/g) |
|---|---|---|---|---|---|
| B-1 | OCN—⟨◯⟩—CH$_2$—⟨◯⟩—NCO | (70) | HO—CH$_2$—C(CH$_3$)(COOH)—CH$_2$—OH | (40) | 1.20 |
|  | OCN—(CH$_2$)$_6$—NCO | (30) | HO—(CH$_2$CH$_2$—O)$_2$—H | (30) |  |
|  |  |  | HO—CH$_2$—⟨◯⟩—CH$_2$—OH | (30) |  |

TABLE 1-continued

| Polyurethane Resin | Diisocyanate Compound | (mol %) | Diol Compound | (mol %) | Acid Value (meq/g) |
|---|---|---|---|---|---|
| C-1 | OCN—C₆H₄—CH₂—C₆H₄—NCO | | HO—CH₂—C(CH₃)(COOH)—CH₂—OH | (50) | 1.29 |
| | | | HO—(CH₂CH₂—O)₂—H | (50) | |
| D-1 | OCN—C₆H₃(CH₃)—C₆H₃(CH₃)—NCO | (40) | HO—C₆H₄—CH(COOH)—C₆H₄—OH | (60) | 1.45 |
| | OCN—(CH₂)₆—NCO | (60) | HO—(CH₂CH₂—O)₂—H | (40) | |
| E-1 | OCN—C₆H₄—CH₂—C₆H₄—NCO | (60) | HO—CH₂—C(CH₃)(COOH)—CH₂—OH | | 2.75 |
| | OCN—(CH₂)₆—NCO | (40) | | | |
| F-1 | OCN—C₆H₄—CH₂—C₆H₄—NCO | (50) | HO—CH₂CH₂—N(CH₂CH₂—OH)—C(=O)—CH₂CH₂—COOH | | 1.35 |
| | OCN—CH₂—C₆H₄—CH₂—NCO (m-) | (50) | | | |
| G-1 | OCN—C₆H₄—CH₂—C₆H₄—NCO | | HO—CH₂—C(CH₃)(COOH)—CH₂—OH | | 2.47 |
| H-1 | OCN—C₆H₃(CH₃)—C₆H₃(CH₃)—NCO | (70) | HO—CH₂—C(CH₃)(COOH)—CH₂—OH | (70) | 1.25 |
| | OCN—(CH₂)₆—NCO | (30) | HO—(CH₂—O)₂—H | (30) | |

SYNTHESIS EXAMPLE 9

21.5 g (0.16 mol) of 2,2-bis-(hydroxymethyl)-propionic acid and 78.9 g (0.04 mol) of a diol compound, Compound No. 10 (hydroxyl number: 56.9 mg KOH/g) were charged into and dissolved in 100 ml of N,N-dimethylacetamide in a 500-ml three-necked round flask equipped with a condenser and an agitator. 50.1 g (0.20 mol) of 4,4'-diphenylmethane diisocyanate was added to the system. The system was then heated to a temperature of 100° C. for 3 hours with stirring. The system was then diluted with 200 ml of N,N-dimethylformamide and 50 ml of acetic acid. The reaction solution was then poured into 4 l of water with stirring and a white polymer was formed. The polymer was filtered off, washed with water, and then dried in vacuo to obtain 145 g of a Polymer (A-2).

Gel permeation chromatography (GPC) was used to determine the molecular weight of the polymer. The result was 37,000 on a weight average basis (standard: polystyrene). Furthermore, titration was used to determine the carboxyl group content (acid value). The result was 1.05 meq/g.

SYNTHESIS EXAMPLES 10–15

Carboxyl group-containing polyurethane resins as shown in Table 2 below were prepared in the same manner as in Synthesis Example 9. The molecular weight of these polyurethane resins each were in the range of 20,000 to 58,000 on a weight average basis (standard: polystyrene).

TABLE 2

| Polyurethane Resin | Diisocyanate Compound | (mol %) | Diol Compound | (mol %) | Acid Value (meq/g) |
|---|---|---|---|---|---|
| B-2 | OCN—C$_6$H$_4$—CH$_2$—C$_6$H$_4$—NCO | (90) | HO—CH$_2$—C(CH$_3$)(COOH)—CH$_2$—OH | (90) | 1.62 |
|  | OCN—(CH$_2$)$_6$—NCO | (10) | Compound No. 10 (Hydroxyl number: 56.9 mgKOH/g) | (10) |  |
| C-2 | OCN—C$_6$H$_3$(CH$_3$)—N(CO)$_2$N—C$_6$H$_3$(CH$_3$)—NCO (uretdione of tolylene diisocyanate) | (50) | HO—CH$_2$—C(CH$_3$)(COOH)—CH$_2$—OH | (90) | 1.54 |
|  | OCN—(CH$_2$)$_6$—NCO | (50) | Compound No. 2 (Hydroxyl number: 54.7 mgKOH/g) | (10) |  |
| D-2 | OCN—C$_6$H$_4$—CH$_2$—C$_6$H$_4$—NCO | (100) | HO—CH$_2$—C(CH$_3$)(COOH)—CH$_2$—OH | (85) | 1.24 |
|  |  |  | Compound No. 14 (Hydroxyl number: 55.2 mgKOH/g) | (15) |  |
| E-2 | OCN—C$_6$H$_3$(CH$_3$)—C$_6$H$_3$(CH$_3$)—NCO (3,3'-dimethyl-4,4'-biphenyl diisocyanate) | (70) | HO—CH$_2$—C(CH$_3$)(COOH)—CH$_2$—OH | (75) | 1.13 |
|  | OCN—(CH$_2$)$_6$—NCO | (30) | Compound No. 19 (Hydroxyl number: 90.5 mgKOH/g) | (25) |  |
| F-2 | OCN—C$_6$H$_4$—CH$_2$—C$_6$H$_4$—NCO | (60) | HO—CH$_2$—C(CH$_3$)(COOH)—CH$_2$—OH | (90) | 1.57 |
|  | Isophorone diisocyanate | (40) | Compound No. 14 (Hydroxyl number: 55.2 mgKOH/g) | (10) |  |
| G-2 | OCN—C$_6$H$_3$(CH$_3$)—C$_6$H$_3$(CH$_3$)—NCO | (70) | HO—C$_6$H$_4$—CH(COOH)—C$_6$H$_4$—OH | (85) | 1.14 |
|  | OCN—(CH$_2$)$_6$—NCO | (30) | Compound No. 23 (Hydroxyl number: 55.2 mgKOH/g) | (15) |  |

SYNTHESIS EXAMPLE 16

Synthesis of 1,4-(or 1,5)-bis(2-Hydroxyethoxycarbonyl)-2,5-(or 2,4)-dicarboxybenzene 43.6 g (0.20 mol) of pyromellitic dianhydride was dissolved in 250 g of ethylene glycol. 15.9 g (0.20 mol) of pyridine was added to the system. The system was then heated to a temperature of 90° C. with stirring for 3 hours. The reaction solvent was distilled off in vacuo to obtain a light brown viscous solid. The solid was then washed with acetonitrile to obtain a light brown powder. After drying, the yield of the product was 51.8 g (76 %). NMR was used to confirm that the product had the above described structure.

SYNTHESIS EXAMPLE 17

Synthesis of Polyurethane Resin (B)

17.1 g (0.05 mol) of the diol compound prepared in Synthesis Example 1, 6.3 g (0.07 mol) of 1,4-butadiol and 8.5 g (0.08 mol) of diethylene glycol were charged into and dissolved in 100 ml of N,N-dimethylacetamide in a 500-ml three-necked round flask equipped with a condenser and an agitator. 35.1 g (0.14 mol) of 4,4'-diphenylmethane and 10.0 g (0.06 mol) of 1,6-hexanediisocyanate were added to the system. 0.01 g of dibutyl tin dilaurate wa added to the system as a catalyst. The system was then heated to a temperature of 100° C. for 5 hours with stirring. The system was then diluted with 200 ml of N,N-dimethylformamide and 50 ml of acetic acid. The reaction solution was then poured into 4 l of water with stirring to form a white polymer. The polymer was filtered off, washed with water, and then dried in vacuo to obtain 75 g of Polymer (A).

Gel permeation chromatography (GPC) was used to determine the molecular weight of the polymer. The result was 35,000 on a weight average basis (standard: polystyrene). Furthermore, titration was used to determine the carboxyl group content (acid value). The result was 1.25 meq/g.

SYNTHESIS EXAMPLE 18

Synthesis of Polyurethane Resin (B)

37.4 g (0.10 mol) of diphenylmethane-4,4'-bis-(hydroxyethylcarbamate) and 32.2 g (0.10 mol) of 3,3',4,4'-benzophenonetetracarboxylic dianhydride were dissolved in 100 ml of N,N-dimethylacetamide. 15.8 g (0.20 mol) of pyridine and 2.5 g (0.02 mol) of 4-dimethylaminopyridine were added to the system. The system was then heated to a temperature of 90° C. for 7 hours with stirring. The system was then diluted with 200 ml of N,N-dimethylformamide and 50 ml of acetic acid. The reaction solution was then poured into 4 l of water with stirring to form a white polymer. The polymer was filtered off, washed with water, and then dried in vacuo to obtain 65 g of Polymer (B). Gel permeation chromatography (GPC) was used to determine the molecular weight of the polymer. The result was 31,000 on a weight average basis (standard: polystyrene). Furthermore, titration was used to determine the carboxyl group content (acid value). The result was 2.82 meq/g.

SYNTHESIS EXAMPLE 19

Synthesis of Polyurethane Resin (C)

300 g of the Polyurethane Resin (B) was dissolved in 200 ml of N,N-dimethylformamide. 5.4 g (0.05 mol) of triethylamine was added to the solution. 6.6 g (0.053 mol) of ethylene bromohydrin was added dropwise to the system with stirring for 10 minutes at a temperature of 80° C. The system was then heated to a temperature of 80° C. with stirring for 3 hours. 30 ml of acetic acid was added to the system. The reaction solution was then poured into 2 l of water to obtain a white polymer. The polymer was filtered off, washed with water, and then dried in vacuo to obtain 32 g of Polymer (C). Gel permeation chromatography (GPC) was used to determine the molecular weight of the polymer. The result was 28,000 on a weight average basis (standard: polystyrene). Furthermore, titration was used to determine the carboxyl group content (acid value). The result was 1.32 meq/g. NMR was used to confirm that some of the carboxyl groups were hydroxyethyl esterified.

SYNTHESIS EXAMPLES 20-24

Polyurethane resins of the present invention as shown in Table 3 (D3-3) below were prepared in the same manner as in Synthesis Example 16. The molecular weight of these polyurethane resins each were in the range of 20,000 to 58,000 on a weight average basis (standard: polystyrene).

TABLE 3

| Poly-urethane | Acid Structure | Resin Acid Value (meq/g) |
|---|---|---|
| D-3 | $\left[-CONH-\bigcirc-CH_2-\bigcirc-NHCO-\right]_{35}\left[-CH_2-\bigcirc-CH_2-NHCO-O-CH_2CH_2OCO-\underset{\underset{COOH}{HO-CO}}{\bigcirc}-COO-CH_2CH_2-O-\right]_{15}\left[-O-CH_2\underset{\underset{CH_3}{CH_3}}{\overset{CH_3}{C}}CH_2-O-\right]_{25}$ | 2.18 |
| E-3 | $\left[-CONH-\bigcirc-CH_2-\bigcirc-NHCO-\right]_{30}\left[-CONH-\underset{H_3C}{\overset{CH_2}{\bigcirc}}\overset{CH_2}{\underset{H}{\bigcirc}}CH_2-NHCO-O-CH_2CH_2OCO-\underset{\underset{COOR}{RO-CO}}{\bigcirc}-COO-CH_2CH_2-O-\right]_{20}\left[-O+CH_2\mathord{\rightarrow}_4O\mathord{\rightarrow}_{25}\right]$ | 1.18 |
| F-3 | $\left[-CONH-\bigcirc-CH_2-\bigcirc-NHCO-\right]_{30}\left[-CH_2-\bigcirc-CH_2-NHCO-O-CH_2CH_2OCO-\underset{\underset{COOR}{RO-CO}}{\bigcirc}-COO-CH_2CH_2-O-\right]_{20}+O-CH_2CH_2N-CH_2CH_2-O\mathord{\rightarrow}_{10}+O-CH_2C=C-CH_2-O\mathord{\rightarrow}_{20}$ $\underset{\underset{CH_2CH_2-COO-R}{C=O}}{|}$ | 1.25 |
| G-3 | $\left[-CONH-\underset{\underset{H_2C}{\bigcirc}}{\overset{\bigcirc}{\bigcirc}}\underset{\underset{N-}{\overset{CO}{\underset{CO}{|}}}}{N}-\underset{CH_3}{\bigcirc}-NHCO+CH_2\mathord{\rightarrow}_6NHCO\mathord{\rightarrow}_{25}\right]_{25}\left[-O-CH_2CH_2-OCO-\underset{\underset{COOH}{HO-CO}}{\bigcirc}-COO-CH_2CH_2-O-\right]_{13}$ | 1.12 |
| H-3 | $\left[-CONH-\underset{H_3C}{\overset{CH_3}{\bigcirc}}-\bigcirc-NHCO+CH_2\mathord{\rightarrow}_6NHCO\mathord{\rightarrow}_{15}\right]_{25}\left[-O-CH_2CH_2OCO-\underset{\underset{COOH}{HO-CO}}{\bigcirc}-COO-CH_2CH_2-O-\right]_{13}+O+CH_2\mathord{\rightarrow}_4O\mathord{\rightarrow}_{17}+O-(CH_2CH_2-O)\mathord{\rightarrow}_{20}+O+CH_2CH_2-O\mathord{\rightarrow}_{20}+O-CH_2CH_2-SO_2-CH_2CH_2-O\mathord{\rightarrow}_{17}+O+CH_2CH_2-O\mathord{\rightarrow}_{20}$ | 1.19 |

The present invention will be further described by the following examples, but the present invention should not be construed as being limited thereto.

EXAMPLE 1

The surface of an aluminum sheet according to JIS1050 was abraded with a rotary nylon brush with an aqueous suspension of pumice as an abrasive. The surface roughness (average roughness on central line) was 0.5 μm. After washing with water, the aluminum sheet was dipped in and etched with a 10 aqueous solution of sodium hydroxide at a temperature of 70° C. so that the dissolution of aluminum reached 6 g/m². After washing with water, the aluminum sheet was dipped in and neutralized with a 30 % aqueous solution of nitric acid, and then thoroughly washed with water. The aluminum sheet was then subjected to electrolytic roughening in a 0.7 % aqueous solution of nitric acid with a rectangular alternating waveform having an anodic voltage of 13 V and a cathodic voltage of 6 V (as described in JP-B-55-19191) over 20 seconds. The aluminum sheet was dipped in a 20 % aqueous solution of nitric acid at a temperature of 50° C. so that the surface thereof was washed. The aluminum sheet was then washed with water. The aluminum sheet was then subjected to anodic oxidation in a 20 % aqueous solution of sulfuric acid so that the weight of the anodic oxide film was 3.0 g/m². The aluminum sheet was further washed with water, and then dried to prepare a substrate.

Onto the substrate was coated the following photoconductive layer coating solution with a bar coater. The material was then dried at a temperature of 120° C. for 10 minutes to prepare an electrophotographic printing plate.

PHOTOCONDUCTIVE LAYER COATING SOLUTION

| | |
|---|---|
| ε-type Copper Phthalocyanine (Liophton ERPC; Toyo Ink Mfg. Co., Ltd.) | 1.0 part |
| Polyethurane Resin (A-1) prepared in Synthesis Example 1 | 10.0 parts |
| Tetrahydrofuran | 48.0 parts |
| Cyclohexanone | 16.0 parts |

The above described materials were charged into a 500-ml glass container with glass beads. The materials were then dispersed using a paint shaker (produced by Toyo Seiki Seisakusho K.K.) for 60 minutes to prepare a photoconductive, layer dispersion.

The electrophotographic printing plate precursor had a dried film thickness of 4.0 μm.

The electrophotographic printing plate precursor thus prepared was then corona-charged at a surface potential of +400 V with a corona charger in the dark, exposed to light from a tungsten lamp, and developed with liquid developer toner, Ricoh MRP (Ricoh Company, Ltd.). Thus, a sharp positive image could be obtained. The printing plate precursor was then heated to a temperature of 120° C. for 2 minutes to fix the toner image.

The material was then dipped in an etching solution obtained by diluting a developer DN-3C for PS (available from Fuji Photo Film Co., Ltd.) with water in a proportion of 1 : 1 for 30 seconds, and thoroughly washed with water to prepare an offset printing plate. Original lines having a width of 20 μm were reproduced in the image thus formed.

COMPARATIVE EXAMPLE 1

An electrophotographic printing plate precursor was prepared in the same manner as in Example 1 except that Polyurethane Resin (A-1) used as a binder resin was replaced by a copolymer of vinyl acetate and crotonic acid (RESYN No. 28-1310, available from Kanebo NSC K.K.). The electrophotographic printing plate precursor thus prepared was then subjected to toner development and fixation in the same manner as in Example 1, dipped in an etching solution obtained by diluting DN-3C with water in a proportion of 1 : 1 for 10 seconds, and thoroughly washed with water to prepare an offset printing plate. The image thus formed did not reproduce original lines having a width of 20 μm due to side etching as compared to Example 1.

COMPARATIVE EXAMPLE 2

An electrophotographic printing plate precursor was prepared in the same manner as in Example 1 except that Polyurethane Resin (A-1) to be used as a binder resin was replaced by a copolymer of butyl methacrylate and methacrylic acid (molar proportion: 7 : 3). The electrophotographic printing plate precursor thus prepared was then subjected to toner development and fixation in the same manner as in Example 1, dipped in an etching solution obtained by diluting DN-3C with water in a proportion of 1 : 1 for 120 seconds, and thoroughly washed with water to prepare an offset printing plate. The image quality was substantially the same as that of Example 1.

These printing plates were then used to effect printing at the same time using an Oliver 52 (molten type printing machine). The ink used was DIC CAPS-G Ink (Dainippon Ink And Chemicals, Incorporated). A solution obtained by diluting EU-3 (available from Fuji Photo Film Co., Ltd.) in a proportion of 1 : 100 (water) was used as wetting water. As a result, printing with the sample of Example 1 and Comparative Example 2 produced about 70,000 sheets. However, printing with the sample of Comparative Example 1 only produced less than about 50,000 sheets. The sample of Comparative Example 2 showed a slight stain in the non-image portion as printing progressed. From these results, it can be said that the printing plate of the present invention has excellent printing resistance as well as image quality.

EXAMPLES 2-4

Electrophotographic printing plates were prepared in the same manner as in Example 1 except that Polyurethane Resin (A-1) incorporated as a binder resin was replaced by the following Polyurethane Resins (B-1) to (D-1), respectively. All of these printing plates exhibited excellent image quality as well as excellent printing resistance.

TABLE 4

| No. | Binder Used | Printing Resistance |
|---|---|---|
| Example 2 | Polyurethane (B-1) | about 60,000 sheets |
| Example 3 | Polyurethane (C-1) | about 70,000 sheets |
| Example 4 | Polyurethane (D-1) | about 70,000 sheets |
| Comparative Example 1 | Vinyl acetate polymer | about 50,000 sheets |

EXAMPLE 5

Onto a substrate prepared as described in Example 1 was coated the following photoconductive layer dispersion using a bar coater to prepare an electrophotographic printing plate.

DISPERSION FOR PHOTOCONDUCTING LAYER

Trisazo Compound 1.0 part

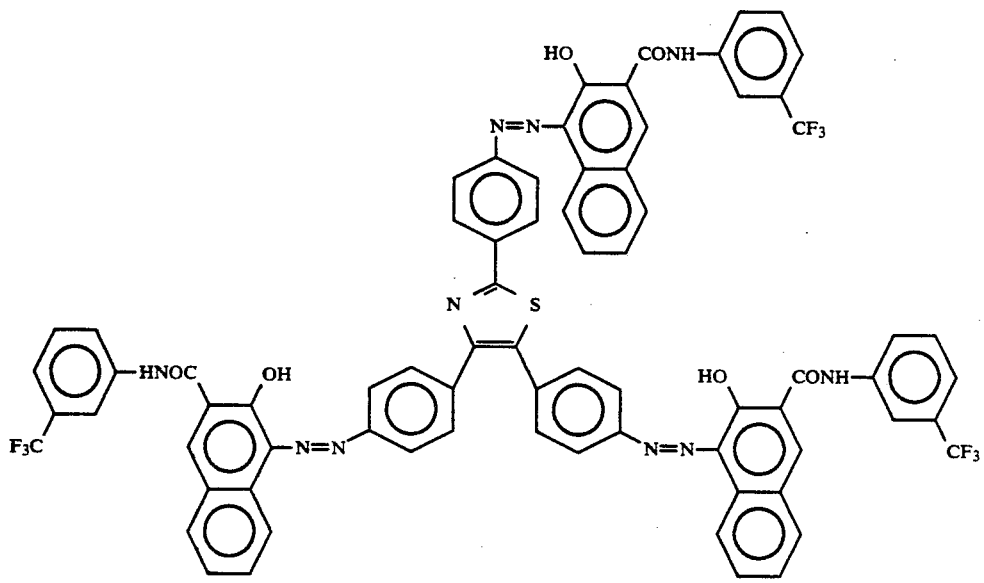

Oxazole Compound 2.5 parts

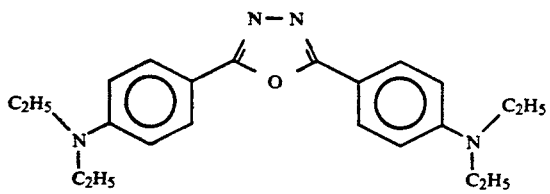

Polyurethane Resin (F-1) 10 parts
Tetrahydrofuran 100 parts

The above described materials were dispersed with glass beads using a paint shaker (produced by Toyo Seiki Seisakusho K.K.) in a 500-ml glass container for 60 minutes.

The electrophotographic printing plate was used to prepare a lithographic printing plate in the same manner described in Example 1. The printing resistance of the lithographic printing plate was about 60,000 sheets. Thus, the lithographic printing plate exhibited excellent image quality as well as excellent printing resistance.

EXAMPLE 6

An electrophotographic printing plate was prepared in the same manner as in Example 5 except that Polyurethane Resin (F-1) incorporated as a binder resin was replaced by Polyurethane Resin (H-1). The printing plate thus prepared had printing resistance of about 70,000 sheets. Thus, the printing plate exhibited excellent image quality as well as excellent printing resistance.

EXAMPLE 7

Onto a substrate prepared as described in Example 1 was coated the following photoconducting layer coating solution using a bar coater. The material was then dried at a temperature of 120° C. for 10 minutes to prepare an electrophotographic printing plate precursor.

PHOTOCONDUCTIVE LAYER COATING SOLUTION

| | |
|---|---|
| x-type Metal-Free Phthalocyanine (Fastogen Blue; Dainippon Ink And Chemicals, Incorporated) | 1.0 part |
| Polyurethane Resin (E-1) | 10.0 parts |
| Tetrahydrofuran | 48.0 parts |
| Cyclohexanone | 16.0 parts |

The above described materials were dispersed with glass beads in a 500-ml glass container using a paint shaker (produced by Toyo Seiki Seisakusho K.K.) for 60 minutes to prepare a photoconductive layer dispersion. The electrophotographic printing plate precursor thus prepared had a dried film thickness of 4.0 μm.

The electrophotographic printing plate precursor thus prepared was then corona-charged at a surface potential of +400 V with a corona charger in the dark, subjected to a scanning exposure with a He-Ne laser, and developed with a liquid developer Ricoh MRP (Ricoh Company, Ltd.). Thus, a sharp positive image could be obtained. The printing plate precursor was then heated to a temperature of 120° C. for 2 minutes to fix the toner image.

The material was then dipped in an etching solution obtained by diluting a developer DN-3C for PS (available from Fuji Photo Film Co., Ltd.) with water in a proportion of 1 : 1 for 30 seconds, and thoroughly washed with water to prepare an offset printing plate.

The printing plate could be used to print about 70,000 sheets. Thus, the printing plate exhibited excellent image quality as well as excellent printing resistance.

EXAMPLES 8-9

Electrophotographic printing plates were prepared in the same manner as in Example 7 except that Polyurethane Resin (E-1) incorporated as a binder resin was replaced by Polyurethane Resins (H-1) to (G-1), respectively. All these printing plates could be used to print about 60,000 sheets. Thus, these printing plates exhibited excellent image quality as well as excellent printing resistance.

EXAMPLE 10

An electrophotographic printing plate precursor was prepared in the same manner as in Example 1 except that the polyurethane resin incorporated as a binder resin was replaced by the Polyurethane Resin A-2.

The electrophotographic printing plate precursor had a dried film thickness of 4.0 $\mu$m.

The electrophotographic printing plate precursor thus prepared was then corona-charged at a surface potential of +400 V using a corona charger in the dark, exposed to light from a tungsten lamp, and developed with a liquid developer Ricoh MRP (Ricoh Company, Ltd.). Thus, a sharp positive image could be obtained. The printing plate precursor was then heated to a temperature of 120° C. for 2 minutes to fix the toner image.

The material was then dipped in an etching solution obtained by diluting a developer DN-3C for PS (available from Fuji Photo Film Co., Ltd.) with water in a proportion of 1 : 1 for 30 seconds, and thoroughly washed with water to prepare an offset printing plate. Original lines having a width of 20 $\mu$m were reproduced in the image thus formed.

COMPARATIVE EXAMPLE 3

An electrophotographic printing plate precursor was prepared in the same manner as in Example 10 except that Polyurethane Resin (A-2) used as a binder resin was replaced by a copolymer of vinyl acetate and crotonic acid (RESYN No. 28-1310, available from Kanebo NSC K.K.). The electrophotographic printing plate precursor thus prepared was then subjected to toner development and fixation in the same manner as in Example 10, dipped in an etching solution obtained by diluting DN-3C with water in a proportion of 1 : 1 for 10 seconds, and thoroughly washed with water to prepare an offset printing plate. As compared to Example 10, the image thus formed did not reproduce original lines having a width of 20 $\mu$m due to side etching.

COMPARATIVE EXAMPLE 4

An electrophotographic printing plate precursor was prepared in the same manner as in Example 10 except that Polyurethane Resin (A-2) used as a binder resin was replaced by a copolymer of butyl methacrylate and methacrylic acid (molar proportion: 7 : 3). The electrophotographic printing plate precursor thus prepared was then subjected to toner development and fixation in the same manner as in Example 10, dipped in an etching solution obtained by diluting DN-3C with water in a proportion of 1 : 1 over 120 seconds, and thoroughly washed with water to prepare an offset printing plate. The image quality was substantially the same as that of Example 10.

These printing plates were then used to effect printing at the same time using Oliver 52 printing machine (molten type printing machine). DIC CAPS-G Ink (Dainippon Ink And Chemicals, Incorporated) was used as the ink. A solution obtained by diluting EU-3 (available from Fuji Photo Film Co., Ltd.) in a proportion of 1 : 100 (water) was used as wetting water. As a result, the samples of Example 10 and Comparative Example 4 could be used to print about 70,000 sheets. However, the sample of Comparative Example 3 could only be used to print less than about 40,000 sheets. The sample of Comparative Example 4 showed a slight stain in the non-image portion as printing progressed. From these results, it can be said that the printing plate of the present invention has excellent printing resistance and also image quality.

EXAMPLES 11-13

Electrophotographic printing plates were prepared in the same manner as described in Example 10 except that Polyurethane Resin (A-2) to be incorporated as a binder resin was replaced by the following Polyurethane Resins (B-3) to (D-3), respectively. All of these printing plates exhibited excellent image quality as well as excellent printing resistance.

TABLE 5

| No. | Binder Used | Printing Resistance |
| --- | --- | --- |
| Example 11 | Polyurethane (B-3) | about 70,000 sheets |
| Example 12 | Polyurethane (C-3) | about 80,000 sheets |
| Example 13 | Polyurethane (D-3) | about 70,000 sheets |
| Comparative Example 3 | Vinyl acetate polymer | about 40,000 sheets |

EXAMPLE 14

Onto a substrate prepared as described in Example 10 was coated a photoconductive layer dispersion prepared in the same manner as in Example 5 except that the polyurethane resin to be incorporated as a binder was replaced by Polyurethane Resin (E-2) using a bar coater to prepare an electrophotographic printing plate precursor.

The electrophotographic printing plate precursor thus prepared was used to prepare a lithographic printing plate, in the same manner as in Example 10. The printing resistance of the lithographic printing plate was about 70,000 sheets. Thus, the lithographic printing plate exhibited excellent image quality as well as excellent printing resistance.

EXAMPLE 15

An electrophotographic printing plate was prepared in the same manner as in Example 1 except that Polyurethane Resin (A-2) to be incorporated as a binder resin was replaced by the following Polyurethane Resin (F-2) shown in Table 2. The printing plate thus prepared exhibited a printing resistance of about 60,000 sheets. Thus, the printing plate exhibited excellent image quality as well as excellent printing resistance.

EXAMPLE 16

Onto a substrate prepared as described in Example 10 was coated a photoconductive layer dispersion prepared in the same manner as in Example 7 except that the polyurethane resin to be incorporated as a binder was replaced by Polyurethane Resin (F-2) using a bar coater. The material was then dried at a temperature of 120° C. for 10 minutes to prepare an electrophotographic printing plate precursor.

The electrophotographic printing plate precursor thus prepared had a dried film thickness of 4.0 μm.

The electrophotographic printing plate precursor thus prepared was then corona-charged at a surface potential of +400 V by a corona charger in the dark, subjected to a scanning exposure using an He-Ne laser, and developed with a liquid developer toner Ricoh MRP (Ricoh Company, Ltd.). Thus, a sharp positive image was obtained. The printing plate precursor was then heated to a temperature of 120° C for 2 minutes to fix the toner image.

The material was then dipped in an etching solution obtained by diluting a developer DN-3C for PS (available from Fuji Photo Film Co., Ltd.) with water in a proportion of 1 : 1 for 30 seconds, and thoroughly washed with water to prepare an offset printing plate.

The printing plate could be used to print about 80,000 sheets. Thus, the printing plate exhibited excellent image quality as well as excellent printing resistance.

EXAMPLES 17–18

Electrophotographic printing plates were prepared in the same manner as in Example 16 except that the Polyurethane Resin (E-2) to be incorporated as a binder resin was replaced by Polyurethane Resins (F-2) and (G-2), respectively. All of these printing plates could be used to print about 60,000 sheets. Thus, these printing plates exhibited excellent image quality as well as excellent printing resistance.

EXAMPLE 19

An electrophotographic printing plate precursor was prepared in the same manner as in Example 1 except that the polyurethane resin to be incorporated as a binder resin was replaced by Polyurethane Resin (A-3). The electrophotographic printing plate precursor had a dried film thickness of 4.0 μm.

The electrophotographic printing plate precursor thus prepared was then corona-charged at a surface potential of +400 V using a corona charger in the dark, exposed to light from a tungsten lamp, and developed with a liquid developer Ricoh MRP (Ricoh Company, Ltd.). Thus, a sharp positive image was obtained. The printing plate precursor was then heated to a temperature of 120° C. for 2 minutes to fix the toner image.

The material was then dipped in an etching solution obtained by diluting a developer DN-3C for PS (available from Fuji Photo Film Co., Ltd.) with water in a proportion of 1 : 1 over 30 seconds, and thoroughly washed with water to prepare an offset printing plate. Original lines having a width of 20 μm were reproduced in the image thus formed.

COMPARATIVE EXAMPLE 5

An electrophotographic printing plate precursor was prepared in the same manner as in Example 19 except that Polyurethane Resin (A-3) to be used as a binder resin was replaced by a copolymer of vinyl acetate and crotonic acid (RESYN No. 28-1310, available from Kanebo NSC K.K.). The electrophotographic printing plate precursor thus prepared was then subjected to toner development and fixation in the same manner as in Example 19, dipped in an etching solution obtained by diluting DN-3C with water in a proportion of 1 : 1 for 10 seconds, and thoroughly washed with water to prepare an offset printing plate. As compared to Example 19, the image thus formed did not reproduce original lines having a width of 20 μm due to side etching.

COMPARATIVE EXAMPLE 6

An electrophotographic printing plate precursor was prepared in the same manner as in Example 19 except that Polyurethane Resin (A-3) to be used as a binder resin was replaced by a copolymer of butyl methacrylate and methacrylic acid (molar proportion: 7 : 3). The electrophotographic printing plate precursor thus prepared was then subjected to toner development and fixation in the same manner as in Example 19, dipped in an etching solution obtained by diluting DN-3C with water in a proportion of 1 : 1 for 120 seconds, and thoroughly washed with water to prepare an offset printing plate. The image quality was substantially the same as that of Example 19.

These printing plates were then used to effect printing at the same time using an Oliver 52 printing machine molten type printing machine). DIC CAPS-G Ink (Dainippon Ink And Chemicals, Incorporated) was used as the ink. A solution obtained by diluting EU-3 (available from Fuji Photo Film Co., Ltd.) with water in a proportion of 1 : 100 (water) was used as wetting water. As a result, the samples of Example 19 and Comparative Example 6 could be used to print samples about 70,000 sheets. However, the sample of Comparative Example 5 could be used to print only less than about 40,000 sheets. The sample of Comparative Example 6 showed a slight stain in the non-image areas as printing progressed. From these results, it can be said that the printing plate of the present invention has excellent printing resistance and also image quality.

EXAMPLES 20–22

Electrophotographic printing plates were prepared in the same manner as in Example 19 except that Polyurethane Resin (A-3) to be incorporated as a binder resin was replaced by the following Polyurethane Resins (B-3), (C-3) and (D-3), respectively. All of these printing plates exhibited excellent image quality as well as excellent printing resistance.

TABLE 6

| No. | Binder Used | Printing Resistance |
| --- | --- | --- |
| Example 20 | Polyurethane (B-3) | about 60,000 sheets |
| Example 21 | Polyurethane (C-3) | about 70,000 sheets |
| Example 22 | Polyurethane (D-3) | about 70,000 sheets |
| Comparative Example 5 | Vinyl acetate polymer | about 40,000 sheets |

EXAMPLE 23

Onto a substrate prepared as described in Example 19 was coated a photoconductive layer dispersion prepared in the same manner as in Example 5 except that the polyurethane resin to be incorporated was replaced by Polyurethane Resin (E-3) using a bar coater to prepare an electrophotographic printing plate.

The electrophotographic printing plate was used to prepare a lithographic printing plate in the same manner as in Example 19. The printing resistance of the lithographic printing plate was about 80,000 sheets. Thus, the lithographic printing plate exhibited excellent image quality as well as excellent printing resistance.

EXAMPLE 24

An electrophotographic printing plate was prepared in the same manner as in Example 19 except that Polyurethane Resin (A-3) to be incorporated as a binder resin was replaced by the Polyurethane Resin (F-3). The printing plate thus prepared exhibited a printing resistance of about 60,000 sheets. Thus, the printing plate exhibited excellent image quality as well as excellent printing resistance.

EXAMPLE 25

Onto a substrate prepared as described in Example 19 was coated a photoconducting layer coating solution prepared in the same manner as in Example 7 except that the polyurethane resin to be incorporated was replaced by polyurethane Resin (F-3) using a bar coater. The material was then dried at a temperature of 120° C. for 10 minutes to prepare an electrophotographic printing plate precursor.

The electrophotographic printing plate precursor thus prepared had a dried film thickness of 4.0 μm.

The electrophotographic printing plate precursor thus prepared was then corona-charged at a surface potential of +scanning exposure using an He-Ne laser, and developed with a liquid developer Ricoh MRP (Ricoh Company, Ltd.). Thus, a sharp positive image was obtained. The printing plate precursor was then heated to a temperature of 120° C. for 2 minutes to fix the toner image.

The material was then dipped in an etching solution obtained by diluting a developer DN-3C for PS (available from Fuji Photo Film Co., Ltd.) with water in a proportion of 1 : 1 for 30 seconds, and thoroughly washing with water to prepare an offset printing plate.

The printing plate could be used to print about 80,000 sheets. Thus, the printing plate exhibited excellent image quality as well as excellent printing resistance.

EXAMPLES 26-27

Electrophotographic printing plates were prepared in the same manner as in Example 25 except that Polyurethane Resin (F-3) to be incorporated as a binder resin was replaced by the Polyurethane Resins (G-3) and (H-3), respectively. All of these printing plates could be used to print about 70,000 sheets. Thus, these printing plates exhibited excellent image quality as well as excellent printing resistance.

While the invention has been described in detail and with reference to specific embodiments thereof, it will be apparent to one skilled in the art that various changes and modifications can be made therein without departing from the spirit and scope thereof.

What is claimed is:

1. An electrophotographic printing plate precursor comprising an electrically-conductive support having thereon a photoconductive layer containing at least a photoconductive compound and binding resin, wherein said binding resin is an alkali-soluble polyurethane resin having a basic skeleton comprising units of diisocyanate compound containing a diisocyanate group represented by formula (I), units of diol compound containing carboxyl group represented by formulae (II), (III) and (IV), and units derived from a compound obtained by ring-opening a tetracarboxylic dianhydride represented by formulae (V), (VI) and (VII) with a diol compound in a an amount of at least 1 mol%:

$$OCN-R_1-NCO \quad (I)$$

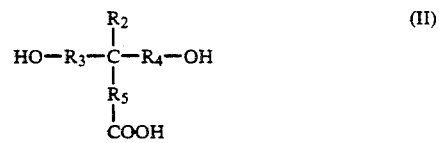

$$HO-R_3-\underset{\underset{COOH}{\overset{R_5}{|}}}{\overset{R_2}{\overset{|}{C}}}-R_4-OH \quad (II)$$

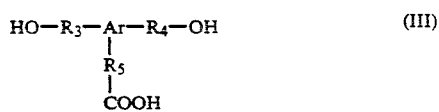

$$HO-R_3-\underset{\underset{COOH}{\overset{R_5}{|}}}{Ar}-R_4-OH \quad (III)$$

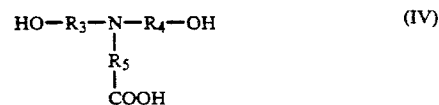

$$HO-R_3-\underset{\underset{COOH}{\overset{R_5}{|}}}{N}-R_4-OH \quad (IV)$$

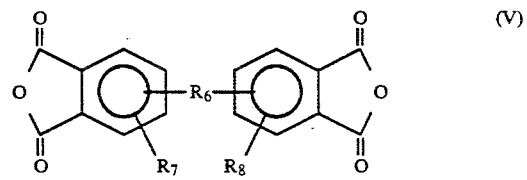

(V)

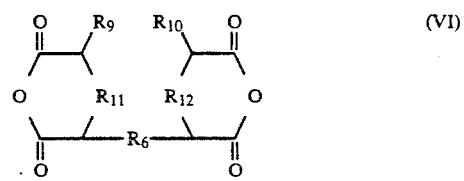

(VI)

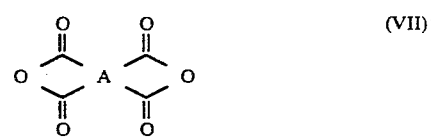

(VII)

$R_1$ represents a divalent aliphatic or aromatic hydrogen having 2 or more carbon atoms which may contain substituents;

$R_2$ represents a hydrogen atom, $C_{1-8}$ alkyl group, $C_{6-15}$ aralkyl group, $C_{6-15}$ aryl group, $C_{1-8}$ alkoxy group, $C_{6-15}$ aryloxy group, which may contain substituents, $-CONH_2$, $-COOR_6$, $-OR_6$, $-NHCONHR_6'$, $-NHCOOR_6'$, $-NHCOR_6'$, $-OCONHR_6'$ or $-CONHR_6$ (wherein $R_6'$ represents $C_{1-10}$ alkyl group or $C_{7-15}$ aralkyl group);

$R_3$, $R_4$ and $R_5$ may be the same or different and each represents a divalent aliphatic or aromatic hydrocarbon group which may contain single bond and substituents, and two or three of $R_2$, $R_3$, $R_4$ and $R_5$ may combine and form a ring;

Ar represents a trivalent aromatic hydrocarbon group which may contain substituents;

$R_6$ represents a divalent aliphatic or aromatic hydrocarbon group having 2 or more carbon atoms which may contain substituent, $-CO-$, $-SO-$, $-SO_2-$, $-O-$ or $-S-$;

$R_7$ and $R_8$ may be the same or different and each represents a hydrogen atom, an alkyl group, an aralkyl group, an aryl group, an alkoxy group, or a halogen atom, and two of $R_6$, $R_7$ and $R_8$ may combine and form a ring;

$R_9$ and $R_{10}$ may be the same or different and each represents a hydrogen atom, an alkyl group, an aralkyl group, an aryl group or a halogen atom, and two of $R_6$, $R_9$ and $R_{10}$ may combine and form a ring;

$R_{11}$ and $R_{12}$ may be the same or different and each represents an unsubstituted saturated single bond or double bond or a divalent aliphatic hydrocarbon group; and A represents a mononuclear or polynuclear aromatic ring.

2. An electrophotographic printing plate precursor as claimed in claim 1, wherein said polyurethane resin further contains at least one diol compound represented by formulae (VIII), (IX), (X), (XI) and (XII):

(VIII)

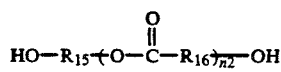
(IX)

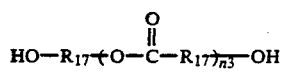
(X)

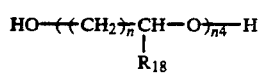
(XI)

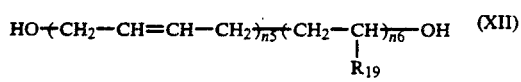
(XII)

wherein $R_{13}$, $R_{14}$, $R_{15}$, $R_{16}$ and $R_{17}$ may be the same or different and each represents a divalent aliphatic or aromatic hydrocarbon group, n represents an integer of 2 to 4, n1, n2, n3, n4 and n5 represent an integer of 2 or more, and n6 represents 0 or an integer of 2 or more, wherein $R_{18}$ represents a hydrogen atom, an alkyl group, an aryl group, an aralkyl group, a cyano group, alkoxy, carbonyl, olefin, ester, or a halogen atom, and wherein $R_{19}$ represents an aryl group or a cyano group.

3. An electrophotographic printing plate precursor as claimed in claim 1, wherein the molecular weight of the alkali-soluble polyurethane resin is 1000 or more.

4. An electrophotographic printing plate precursor as claimed in claim 3, wherein the molecular weight of the alkali-soluble polyurethane resin is 5000 to 100,000.

5. An electrophotographic printing plate precursor as claimed in claim 1, wherein the photoconductive compound is a triazole derivative, an oxadiazaole derivative, an imidazole derivative, a polyarylalkane derivative, a pyrazoline derivative, a pyrazolone derivative, a phenylenediamine derivative, an arylamine derivatives an amino-substituted chalcone derivative, an N,N-bicarbazyl derivative, and oxazole derivative, a styrylanthracene derivative, a fluorenone derivative, a hydrazone derivative, a benzidine derivative, a stilbene derivative, a polyvinylcarbazole or derivative, a polyvinylpyrene, a polyvinylanthracene, a poly-2-vinyl-4-(4-dimethylaminophenol), a polyacenaphthylene, a polyindene, a copolymer of acenaphthylene and styrene, a pyrene-formaldehyde resin, a bromopyrene-formaldehyde resin, an ethylcarbazole-formaldehyde resin or a triphenylmethane polymer.

6. An electrophotographic printing plate precursor as claimed in claim 1, wherein the polyurethane resin containing layer also contains at least one of a pigment and a sensitizing dye.

7. An electrophotographic printing plate precursor as claimed in claim 1, wherein the thickness of the photoconductive layer is 0.1 to 30 μm.

8. An electrophotographic printing plate precursor as claimed in claim 1, wherein the amount of the photoconductive compound present in the photoconductive layer is 0.05 parts by weight or more per part by weight of the binding resin.

9. An electrophotographic printing plate precursor as claimed in claim 1, wherein the electroconductive support is an aluminum support.

10. An electrophotographic printing plate precursor as claimed in claim 1, wherein the printing plate precursor includes an adhesivity improving layer intermediate said electroconductive support and said photoconductive layer and an overcoat layer capable of being removed with the removal of said photoconductive layer in formation of a printing plate from said printing plate precursor.

* * * * *